(12) United States Patent
Koltun et al.

(10) Patent No.: US 9,997,146 B2
(45) Date of Patent: Jun. 12, 2018

(54) DRUM ASSEMBLY HAVING INTERNAL LIGHT PATTERN DISPLAY CAPABILITY

(71) Applicant: Drew M. Koltun, San Diego, CA (US)

(72) Inventors: Drew M. Koltun, San Diego, CA (US); Jonathan Daniel Driscoll, La Jolla, CA (US); Travis Joseph Wong, La Jolla, CA (US)

(73) Assignee: Drew M. Koltun, San Diego, CA (US)

( * ) Notice: Subject to any disclaimer, the term of this patent is extended or adjusted under 35 U.S.C. 154(b) by 0 days. days.

(21) Appl. No.: 15/481,900

(22) Filed: Apr. 7, 2017

(65) Prior Publication Data

US 2017/0213532 A1    Jul. 27, 2017

Related U.S. Application Data

(63) Continuation-in-part of application No. 15/440,574, filed on Feb. 23, 2017, now abandoned, which is a continuation of application No. 14/971,929, filed on Dec. 16, 2015, now Pat. No. 9,591,733.

(51) Int. Cl.

| | |
|---|---|
| *A63J 17/00* | (2006.01) |
| *A63J 5/10* | (2006.01) |
| *G10H 1/00* | (2006.01) |
| *G10G 7/00* | (2006.01) |
| *G10D 13/02* | (2006.01) |
| *F21V 33/00* | (2006.01) |
| *G06T 13/20* | (2011.01) |
| *H04N 9/31* | (2006.01) |

(52) U.S. Cl.
CPC ........... *G10G 7/00* (2013.01); *F21V 33/0056* (2013.01); *G06T 13/205* (2013.01); *G10D 13/02* (2013.01); *H04N 9/3161* (2013.01); *G10H 2210/051* (2013.01); *G10H 2210/066* (2013.01)

(58) Field of Classification Search
CPC .... G10H 2220/525; G10H 1/00; G10H 3/146; G10H 3/06; G10H 2220/091; G10D 13/00; G10D 13/02; G10D 13/028; F21K 9/23; F21K 2/04; F21K 5/023; F21K 9/238

See application file for complete search history.

(56) References Cited

U.S. PATENT DOCUMENTS

| | | |
|---|---|---|
| 3,550,497 A | 12/1970 | Marsh |
| 3,719,857 A | 3/1973 | Sharp |

(Continued)

*Primary Examiner* — Marlon Fletcher
(74) *Attorney, Agent, or Firm* — Roeder & Broder LLP; James P. Broder

(57) ABSTRACT

A drum assembly includes a drum, a stimulus processor assembly and a light pattern display generator. The drum includes a drum shell that at least partially defines a drum interior. The stimulus processor assembly receives a stimulus, generates an input signal, and converts the input signal to an output signal. The light pattern display generator receives the output signal from the stimulus processor assembly. The light pattern display generator generates a light pattern display in response to the output signal. Additionally, the light pattern display generator projects the light pattern display at least partially within the drum interior. The light pattern display generator can include one or more of an animation laser, a hologram projector and a lumin disk. The stimulus can be generated by the drum or by a source remote from the drum.

21 Claims, 10 Drawing Sheets

(56) References Cited

U.S. PATENT DOCUMENTS

| | | | | |
|---|---|---|---|---|
| 4,353,008 | A | * | 10/1982 | Dorfman .................. A63J 17/00 315/114 |
| 4,843,627 | A | | 6/1989 | Stebbins |
| 5,922,981 | A | * | 7/1999 | Ballister ................. A63J 17/00 84/464 A |
| 5,977,473 | A | * | 11/1999 | Adinolfi ............... G10D 13/024 84/104 |
| 6,150,600 | A | * | 11/2000 | Buchla ................. G10H 1/0555 84/688 |
| 7,271,328 | B2 | | 9/2007 | Pangrle |
| 7,501,571 | B2 | | 3/2009 | Forsman et al. |
| 2004/0200338 | A1 | * | 10/2004 | Pangrle ................... G10H 3/06 84/724 |
| 2005/0172785 | A1 | | 8/2005 | Fisher-Robbins et al. |
| 2008/0127804 | A1 | | 6/2008 | Lashbrook et al. |
| 2008/0245211 | A1 | * | 10/2008 | Lemons ................. G09B 15/00 84/470 R |
| 2015/0009417 | A1 | * | 1/2015 | Jargiello, III ....... F21V 33/0056 348/789 |
| 2017/0178607 | A1 | * | 6/2017 | Koltun ................... G10D 13/02 |

\* cited by examiner

DRUM ASSEMBLY HAVING INTERNAL LIGHT PATTERN DISPLAY CAPABILITY

RELATED APPLICATIONS

The present application is a continuation-in-part application and claims the benefit under 35 U.S.C. 120 on copending U.S. patent application Ser. No. 15/440,574, filed on Feb. 23, 2017. Further, U.S. patent application Ser. No. 15/440,574 is a continuation application that claims the benefit under 35 U.S.C. 120 on then U.S. patent application Ser. No. 14/971,929, filed on Dec. 16, 2015, which is now U.S. Pat. No. 9,591,733 B1, issued on Mar. 7, 2017. To the extent permitted, the contents of U.S. patent application Ser. No. 15/440,574 and U.S. Pat. No. 9,591,733 B1 are incorporated herein by reference.

BACKGROUND

Musical events have provided entertainment to avid music aficionados for centuries. In the past several decades, musical performers have increased the visual showmanship of their concerts to better entertain their fans. For example, large screens have been added behind the bands, showing the individual musicians up close while performing, and providing thematic videos during concerts. Multi-colored spotlights are commonly used to highlight a specific band member's musical prowess. Further, various props are often used to keep the attention of the enthusiast attendees. As technology steadily advances, the nature of the visual aids utilized during such performances likewise becomes increasingly more complex.

SUMMARY

The present invention is directed toward a drum assembly. In various embodiments, the drum assembly includes a drum, a stimulus processor assembly and a light pattern display generator. The drum includes a drum shell that at least partially defines a drum interior. The stimulus processor assembly receives a stimulus, generates an input signal, and converts the input signal to an output signal. The light pattern display generator receives the output signal from the stimulus processor assembly. The light pattern display generator generates a light pattern display in response to the output signal. Additionally, the light pattern display generator projects the light pattern display at least partially within the drum interior.

In certain embodiments, the stimulus processor assembly includes a controller that converts the input signal to the output signal using a conversion algorithm.

In some embodiments, the light pattern display generator is an animation laser that is positioned outside of the drum interior. The animation laser projects at least a portion of the light pattern display into the drum interior. In certain such embodiments, the drum assembly further includes a display receptor assembly that is positioned at least partially within the drum interior. The display receptor assembly is configured to capture at least a portion of the light pattern display that is projected into the drum interior. In one such embodiment, the display receptor assembly includes at least one scrim that is positioned within the drum interior, and the at least one scrim is configured to capture at least a portion of the light pattern display that is projected into the drum interior. Alternatively, in another such embodiment, the display receptor assembly includes a smoke generator that is coupled to the drum to generate a smoke cloud within the drum interior, and the smoke cloud is configured to capture at least a portion of the light pattern display that is projected into the drum interior.

Alternatively, the light pattern display generator can be a hologram projector that is positioned outside of the drum interior, the hologram projector projecting at least a portion of the light pattern display into the drum interior.

Still alternatively, the light pattern display generator can be a lumin disk that is positioned adjacent to the drum shell within the drum interior.

In certain embodiments, the light pattern display generator generates the light pattern display only when the input signal has a voltage amplitude that exceeds a predetermined threshold level.

In various embodiments, the stimulus can be generated by one or more drums. In alternative embodiments, the stimulus can be generated remotely from the drum. For example, in some such alternative embodiments, the stimulus can be generated by a musical instrument digital interface input.

In various applications of the drum assembly, the light pattern display has an intensity that is correlative to at least one of a decibel level of the stimulus, a pulse width of the output signal, and a frequency of the output signal.

In certain embodiments, the light pattern display is projected substantially entirely within the drum interior.

Additionally, in certain embodiments, the input signal is an analog signal, and the output signal is a digital signal.

Further, the present invention is also directed toward a method comprising the steps of generating an input signal from a stimulus with a stimulus processor assembly; converting the input signal to an output signal with the stimulus processor assembly; transmitting the output signal to a light pattern display generator; generating a light pattern display with the light pattern display generator in response to the output signal that occurs at least partially within a drum interior of a drum.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Embodiments of the present invention are described herein in the context of a drum assembly. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same or similar reference indicators will be used throughout the drawings and the following detailed description to refer to the same or like parts.

In the interest of clarity, not all of the routine features of the implementations described herein are shown and described. It will, of course, be appreciated that in the development of any such actual implementations, numerous implementation-specific decisions must be made in order to achieve the developer's specific goals, such as compliance with application-related and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
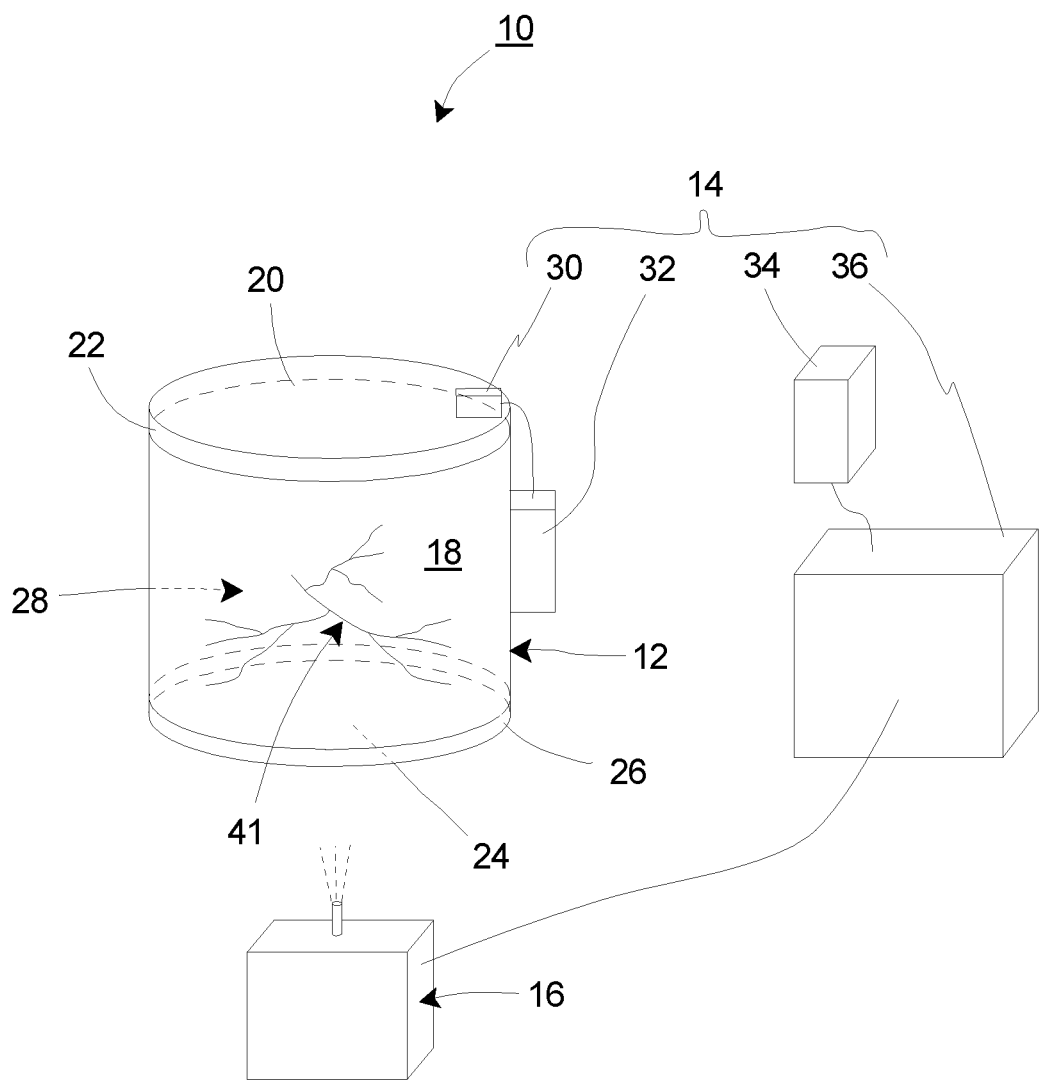
FIG. 1 is a simplified schematic illustration of an embodiment of a drum assembly having features of the present invention, the drum assembly including a drum, a light pattern display generator and a controller.

FIG. 1 is a simplified schematic illustration of an embodiment of a drum assembly 10 having features of the present invention. In particular, in this embodiment, the drum assembly 10 includes one or more musical drums 12 (also referred to herein simply as a "drum") that are often part of a musical drum kit, a stimulus processor assembly 14, and one or more light pattern display generators 16 (only one light pattern display generator 16 is illustrated in FIG. 1). In various embodiments, as shown in FIG. 1, the light pattern display generator 16 can include an animation laser. Alternatively, the light pattern display generator 16 can include a non-animation laser (i.e. a laser without animation capabilities), a hologram projector, a lumin disk, or another suitable device that is capable of generating a light pattern display.

In various embodiments, the drum(s) 12 being hit or otherwise struck (e.g., by a drumstick or other implement) generate a stimulus (or stimuli) in the form of sound and/or vibration that is transmitted to the stimulus processor assembly 14 for processing as described in greater detail below. In the embodiments where the drum 12 generates the stimulus, the drum 12 can also be referred to as a "stimulus generator". In non-exclusive alternative embodiments, other devices can generate the stimulus or stimuli, which may or may not use software to do so, such as a musical instrument digital interface (MIDI) drum pad, Digital Multiplex (DMX) controller, electronic notebook, laptop, iPhone, MP3 player, iPad, or any other type of input or file, in which case those other devices can be referred to as the "stimulus generator", as described in greater detail below.

The size, shape and type of the drum(s) 12 (only one drum 12 is illustrated in FIG. 1), can vary depending upon the specific design requirements of the drum assembly 10. For example, the teachings provided herein can be equally utilized with a snare drum, a bass drum, a tom, or any other suitable type of drum 12. Further, although the description provided herein is particularly suited toward a drum assembly 10 having one or more drums 12, it is recognized that the teachings provided herein can equally apply to other suitable types of musical instrument assemblies. In addition, it is also recognized that certain embodiments of the drum assembly 10 can include additional features not shown and/or described herein, or can omit various features shown or described herein. Moreover, multiple drum assemblies 10, each having the features described herein, can be utilized concurrently.

In certain embodiments, the drum 12 can include one or more of a drum shell 18, a top head 20 (also sometimes referred to herein as a "first head"), a top hoop 22 (also sometimes referred to herein as a "first hoop"), a bottom head 24 (also sometimes referred to herein as a "second head"), and a bottom hoop 26 (also sometimes referred to herein as a "second hoop"). It is understood that as used herein, either head 20, 24 can be the first head or the second head. It is further understood that as used herein, either hoop 22, 26 can be the first hoop or the second hoop. It is recognized that many drums 12 include other features than those specifically identified and described herein. The drums illustrated in the Figures are intended to be representative of any suitable drum that may be used in any drum kit (or by itself) normally used by musicians.

Additionally, in some embodiments, e.g., when the drum 12 is a bass drum, the first head 20 can be positioned to face in a generally forward or outward direction toward an audience and away from the drummer; and the second head 24 can be positioned to face in a generally backward direction toward the drummer. Alternatively, in other embodiments, e.g., when the drum 12 is a snare drum or a tom, the first head 20 can be positioned to face in a generally upward direction and the second head 24 can be positioned to face in a generally downward direction.

As illustrated, the drum 12 also includes a drum interior 28 that can be defined and/or bounded partially or fully by one or more of the drum shell 18, the first head 20 and the second head 24. In one embodiment, the drum shell 18 can have a substantially cylindrical configuration. Alternatively, the drum shell 18 can have other suitable polygonal geometries or other configurations. Further, in certain embodiments, at least a portion of the drum shell 18 can be clear or see-through. Although the drum shell 18 may have any suitable color, in various embodiments, the drum shell 18 is substantially transparent to a light source. In some embodiments, the drum shell 18 is formed from one or more acrylics or other plastics. Still alternatively, the drum shell 18 can be formed from any other suitable material, provided that at least part of the drum shell 18 is at least partially transparent to light.

In some embodiments, the first head 20 is secured or coupled to the drum shell 18 with the first hoop 22. Similarly, the second head 24 can be secured or coupled to the drum shell 18 with the second hoop 26. Additionally, the first hoop 22 and/or the second hoop 26 can be secured to the drum shell 18 by various structures known to those skilled in the art, such as tension rods (not shown), lugs (not shown), etc. Further, in certain embodiments, at least one of the first head 20 and the second head 24 can be clear, see-through or at least substantially transparent to light.

Figure 2:
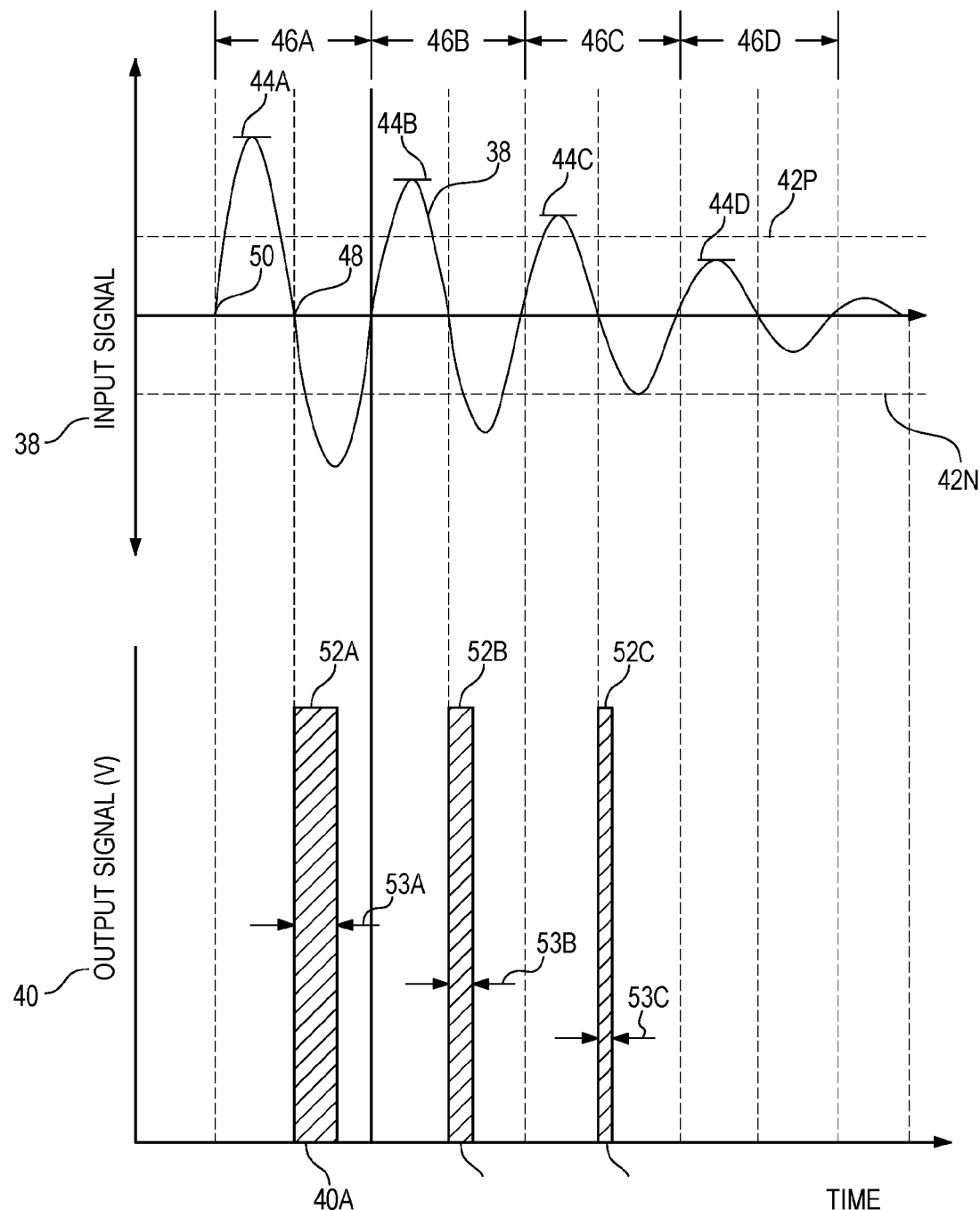
FIG. 2 is a simplified graphical representation of an embodiment of a conversion of an input signal to an output signal using the controller of the drum assembly.

The stimulus processor assembly 14 processes each stimulus generated by the stimulus generator, which in FIG. 1 is one or more drums 12, and converts each stimulus to an electrical input signal 38 (also referred to herein as an "input voltage signal" or simply as an "input signal"; illustrated in FIG. 2). The stimulus processor assembly 14 then converts each input signal 38 to an output voltage signal 40 (also referred to herein simply as an "output signal"; illustrated in FIG. 2). In one embodiment, the stimulus processor assembly 14 includes a microphone 30, a transmitter 32, a receiver 34 and a controller 36. In the embodiment illustrated in FIG. 1, the user plays the drum 12 thereby eliciting stimuli in the form of sounds, vibrations or any other suitable stimuli. The microphone 30 receives and senses the stimuli and converts the stimuli to electrical input signals 38. Any drum(s) 12 can elicit the stimulus that is received by the microphone 30.

In one embodiment, the microphone 30 can be positioned adjacent to and/or can be secured to the drum 12. Alternatively, the microphone 30 can be positioned more remotely from the drum 12. The specific type of microphone 30 that can be used can vary depending upon the design requirements of the drum assembly 10. In one embodiment, the microphone 30 can include a contact microphone. However, other suitable types of microphones 30 can also be utilized. Still alternatively, various types of transducers can be used to sense pressure changes, vibrations, etc. In various non-exclusive alternative embodiments, as used herein, the term "microphone" can also equally include a pressure transducer, an optical sensor, or a separate digital controller. Stated another way, the term microphone 30 herein refers to any device that receives and/or senses the stimulus and converts the stimulus to the electrical input signal 38.

The transmitter 32 receives the input signals 38 from the microphone 30 and transmits these input signals 38 to the receiver 34. In certain embodiments, the transmitter 32 can wirelessly transmit the input signals 38 to the receiver 34 in order to effectively electrically isolate the microphone 30 from the receiver 34 and/or the controller 36. In non-exclusive alternative embodiments, the isolation between the microphone 30 and the receiver 34 and/or the controller 36 can be accomplished optically or by using an isolation transformer. Still alternatively, the transmitter 32 can be hard-wired to the receiver 34, or the transmitter 32 can be linked to the receiver 34 via a fiber optic connection, as non-exclusive examples.

The receiver 34 receives the input signals 38 from the transmitter 32 and sends the input signals 38 to the controller 36. In one embodiment, the receiver 34 can be part of and/or integrated as part of the controller 36. Alternatively, the receiver 34 can be a separate unit from the controller 36.

The controller 36 reads the input signals 38 that are received by the receiver 34 and converts them to output signals 40, as described herein. The controller 36 also transmits these output signals 40 to the light pattern display generator 16, i.e. the animation laser in the embodiment shown in FIG. 1. The design of the controller 36 can be varied to suit the various requirements of the drum assembly 10. In certain embodiments, the controller 36 includes a processor and utilizes one or more conversion algorithms to convert the input signals 38 to output signals 40. For example, the conversion algorithm can filter out noise or signal-shape the input signals 38 into the output signals 40. In certain embodiments, the input signals 38 can also or alternatively be processed by analog electronics known to those skilled in the art. This can include pre-amplification, buffering and/or filtering, which can reduce overtones and/or high-frequency noise in the input signals 38. For example, by applying a low-pass filter, a more "pure" waveform can be produced allowing for better detection of zero-crossings (see e.g., FIG. 2). This analog processing can also include a volume knob (not shown) and/or overvoltage protection since the dynamic range of a percussive instrument can be relatively large. Alternatively, or in addition, at least some of this analog-type processing can also (or alternatively) be accomplished by a digital stimulus processor (DSP) in the digital domain.

In various embodiments, the controller 36 digitizes the input signals 38 using an analog to digital converter (ADC). This digitization contributes to the formation of an output signal 40 in the form of a signal pulse or a series of signal pulses, as described herein. In certain embodiments, a further DSP can be applied in the digital domain, which can include DC offset removal, low-pass filtering, or any other frequency-shaping techniques known to those skilled in the art. The output signals 40 are then sent by the controller 36 to the animation laser 16 for selective generation of a laser output, i.e. a light pattern display 41 (also sometimes referred to herein as "light display"), by the animation laser 16 that is projected within the drum interior 28. The connection between the controller 36 and the animation laser 16 can be via any suitable hard wiring or cabling, such as DMX cables or a fiber optic cable, as non-exclusive examples. Alternatively, the connection between the controller 36 and the animation laser 16 can be wireless. Additionally, the animation laser 16 can be powered externally by a typical AC power connection.

As provided herein, in order to effectively exhibit the light display 41 to the audience, it is desired that at least a portion of one surface of the drum 12, i.e. at least a portion of the first head 20, the second head 24 or the drum shell 18, should be clear, see-through or at least substantially transparent to light.

It is appreciated that the light display 41 can have any suitable design. More specifically, the light pattern display generator 16 can include programming software for purposes of generating any desired design with the light display 41. For example, in certain non-exclusive alternative embodiments, the animation of the light display 41 can be configured to provide the appearance of one or more of an animal, a person, a shape, alphanumeric characters, one or more chaotic patterns (e.g., lightning), animations (both two-dimensional and three-dimensional), or any combination thereof. Additionally, the color or colors that are included within the light display 41 can also be controlled, e.g., by the controller 36 or by the light pattern display generator 16 itself. Alternatively, any desired patterns or designs for the light display 41 can come stock on the light pattern display generator 16.

FIG. 2 is a graphical representation of conversion of the analog input voltage signal 38 to the digital output voltage signal 40. The conversion algorithm used by the controller 36 (illustrated in FIG. 1) can result in a number of different effects upon the animation laser 16 (illustrated in FIG. 1). In one embodiment, the conversion algorithm used by the controller 36 can use a thresholding technique to determine whether the drum 12 (illustrated in FIG. 1) has actually been struck. For example, the input signal 38, which is bipolar, is monitored to determine whether it crosses a minimum threshold such as a positive voltage threshold level 42P (although a negative voltage threshold level 42N could alternatively or also be used). In one embodiment, the thresholding inhibits the animation laser 16 from randomly discharging due to extraneous noise, and is set to a voltage threshold level 42P (also sometimes referred to herein as "threshold level") that is above a certain noise level.

Either or both of the voltage threshold levels 42P, 42N, can be predetermined by the user. Stated another way, the sensitivity of the animation laser 16 for purposes of generating the desired light display 41 (illustrated in FIG. 1) can be tuned by the user by adjusting either or both of the voltage threshold levels 42P, 42N to attain the desired light display 41 of the animation laser 16. For example, the user may want the animation laser 16 to generate a light display 41 only when the user strikes the drum 12 with great force, in which case one or both of the voltage threshold level 42P, 42N can be increased. Alternatively, the user may want the animation laser 16 to generate a light display 41 when the user strikes the drum 12 with much lesser force, in which case one or both of the voltage threshold level 42P, 42N can be decreased.

Further, a maximum input signal amplitude 44A-D of each respective cycle 46A-D of the input signal 38 can be constantly or periodically monitored. Tracking of the maximum input signal amplitude 44A-D of the input signal 38 allows the generation of the light display 41 by the animation laser 16 to be modulated by the playing intensity (dynamics) of the user of the drum 12. In the embodiment illustrated in FIG. 2, upon a positive-to-negative zero crossing 48 (one representative positive-to-negative zero crossing 48 is illustrated in FIG. 2), the animation laser 16 generates a light display 41. Alternatively, the animation laser 16 can be set to generate a light display 41 at a time different than the positive-to-negative zero crossing 48, such as a negative-to-positive zero crossing 50 or any other time during the cycle 46A-D.

In the embodiment illustrated in FIG. 2, the maximum input signal amplitude 44A exceeds the positive threshold level 42P during cycle 46A. As a result, in this embodiment, the output signal 40A for this cycle 46A is elicited having an output amplitude 52A. Further, the maximum input signal amplitudes 44B, 44C, also exceed the positive threshold level 42P during cycles 46B, 46C, respectively. As a result, output signals 40B, 40C, are elicited having output amplitudes 52B, 52C, respectively. However, the maximum input signal amplitude 44D does not exceed the positive threshold level 42P during cycle 46D. As a result, no output signal for this cycle 46D is elicited, and the animation laser 16 does not generate a light display 41 during this cycle 46D. In an alternative embodiment, thresholding is not utilized so that essentially all input signals 38 result in eliciting output signals 40, at least to some extent.

In this embodiment, a pulse width 53A-53C for each of the respective output signals 40A-40C is correlative to the maximum input signal amplitude 44A-44C, respectively. For example, because the maximum input signal amplitude 44A is greater than the maximum input signal amplitude 44B, the pulse width 53A of the output signal 40A is greater than the pulse width 53B of the output signal 40B. Somewhat similarly, because the maximum input signal amplitude 44B is greater than the maximum input signal amplitude 44C, the pulse width 53B of the output signal 40B is greater than the pulse width 53C of the output signal 40C. In general, the greater the pulse width 53A-53C of the output signal 40, the greater the intensity of the light display 41 that is generated by the animation laser 16. Stated in another manner, in such embodiment, the intensity of the light pattern display 41 is correlative to the pulse width 53A-53C of the output signal 40. It is recognized that the intensity of the light display 41 generated by the animation laser 16 can further be modulated by modulating the time of the pulse widths 53A-53C of the output signal 40 and/or the frequency of the pulses of the output signal 40.

Additionally and/or alternatively, in other embodiments, the intensity of the light pattern display 41 generated by the light pattern display generator 16, e.g., the animation laser, can be correlative to a decibel level of the stimulus from the stimulus generator. Still alternatively, the intensity of the light pattern display 41 can be correlative to a frequency of the output signal 40.

In general, the controller 36 can process additional user information via buttons, switches and potentiometers (not shown). The potentiometers allow the user to adjust relevant parameters of the input signal 38 to impact or influence the character of the output signal 40, such as threshold level, duration (pulse width), frequency and sonic characteristics. For example, the output signal 40 can fire at some multiple or sub-multiple of the frequency of the input signal 38 to change the characteristics of the light display 41 generated by the animation laser 16. For instance, if a fundamental (dominant) frequency read from the drum 12 is F, firing at every positive-to-negative and negative-to-positive zero crossing 48, 50, would result in an output frequency of 2F. If firing only happens on the positive-to-negative zero crossings 48 or the negative-to-positive zero crossings 50, the output pulse frequency would be F, which would be substantially similar or identical to the frequency of the drum 12. More advanced processing, such as only firing on every other or every third, etc., positive-to-negative zero crossing 48 or negative-to-positive zero crossing 50 would result in an output frequency of the animation laser 16 of F/2 or F/3, etc., which would create a sub-octave or other harmonics below the original frequency F of the drum 12.

The conversion algorithm used by the controller 36 to generate the output signals 40 can be relatively complex in order to provide a substantially synchronous strike of the drum 12 with the light display 41 generated by the animation laser 16. Further, the conversion algorithm used by the controller 36 can cause the animation laser 16 to respond fundamentally differently at different playing volumes and rates, or respond to longer term patterns, such as an increase in drumming intensity over time, as one non-exclusive example. Further, the conversion algorithm can be tuned to cause a time shift in the output signals 40, to either be substantially synchronous with the timing of the input signals 38, or to be delayed following the input signals 38. It is understood that the conversion algorithm(s) can be "tuned" to generate many different effects of the light display 41 generated by the animation laser 16, and that the foregoing description is not intended to be limiting in any manner to the types of effects that can be generated by the animation laser 16. It is further understood that those skilled in the art of conversion of analog signals to digital signals can further manipulate such conversion to achieve any desired result for the timing, intensity, tuning, duration, etc., of the light display 41 of the animation laser 16.

Referring back to FIG. 1, the light pattern display generator 16, i.e. the animation laser in this embodiment, is positioned near and/or can be mounted on an exterior of the drum 12. During use of the drum assembly 10, the animation laser 16 receives the output signal 40 from the controller 36 and then selectively generates a laser output, i.e. a light display 41 that travels to the drum interior 28 in a substantially controlled manner. Importantly, the drum interior 28 that ultimately receives the light display 41 that is generated by the animation laser 16 may or may not be part of the drum 12 that elicited the stimulus. For example, the drum 12 that elicits the stimulus can be the same drum 12 or a different drum 12 (or another external stimulus generator) than that which receives the light display 41 that is generated by the animation laser 16.

Additionally, as provided in detail herein below, in various embodiments, the drum assembly 10 further includes a display receptor assembly (not shown in FIG. 1), e.g., a scrim assembly, a smoke assembly, or another suitable display receptor assembly, that is positioned at least partially within the drum interior 28. In such embodiments, the light display 41 can be directed toward the display receptor assembly, which essentially captures the light display 41 within the drum interior 28 to better and more effectively exhibit the light display 41 to the audience. For example, in some such embodiments, the display receptor assembly can be configured to give the light display 41 a three-dimensional appearance to the audience. Alternatively, the drum assembly 10 can be designed without the display receptor assembly and the light display 41 can be projected directly onto a surface of the drum 12.

Further, in some embodiments, one or more surfaces of the drum 12 can be configured to inhibit the light display 41 from passing completely through the drum interior 28 and out the other side. More specifically, at least a portion of the drum shell 18, the first head 20 or the second head 24 can be formed from a material and/or coated with a substance that is specifically designed to inhibit the laser output, i.e. the light display 41, from passing through such surface. With such design, the light display 41 can be fully maintained within the drum interior 28, and the drummer (and others) will be protected from the laser output 41, which may otherwise create a risky situation if allowed to freely pass fully through the drum interior 28.

Although the disclosure provided herein only describes the use of one drum assembly 10, it is recognized that multiple drum assemblies 10 can be utilized simultaneously, with each drum assembly 10 having all of the components described herein, or each drum assembly 10 sharing various components to avoid duplication and allow for greater simplicity.

Figure 3:
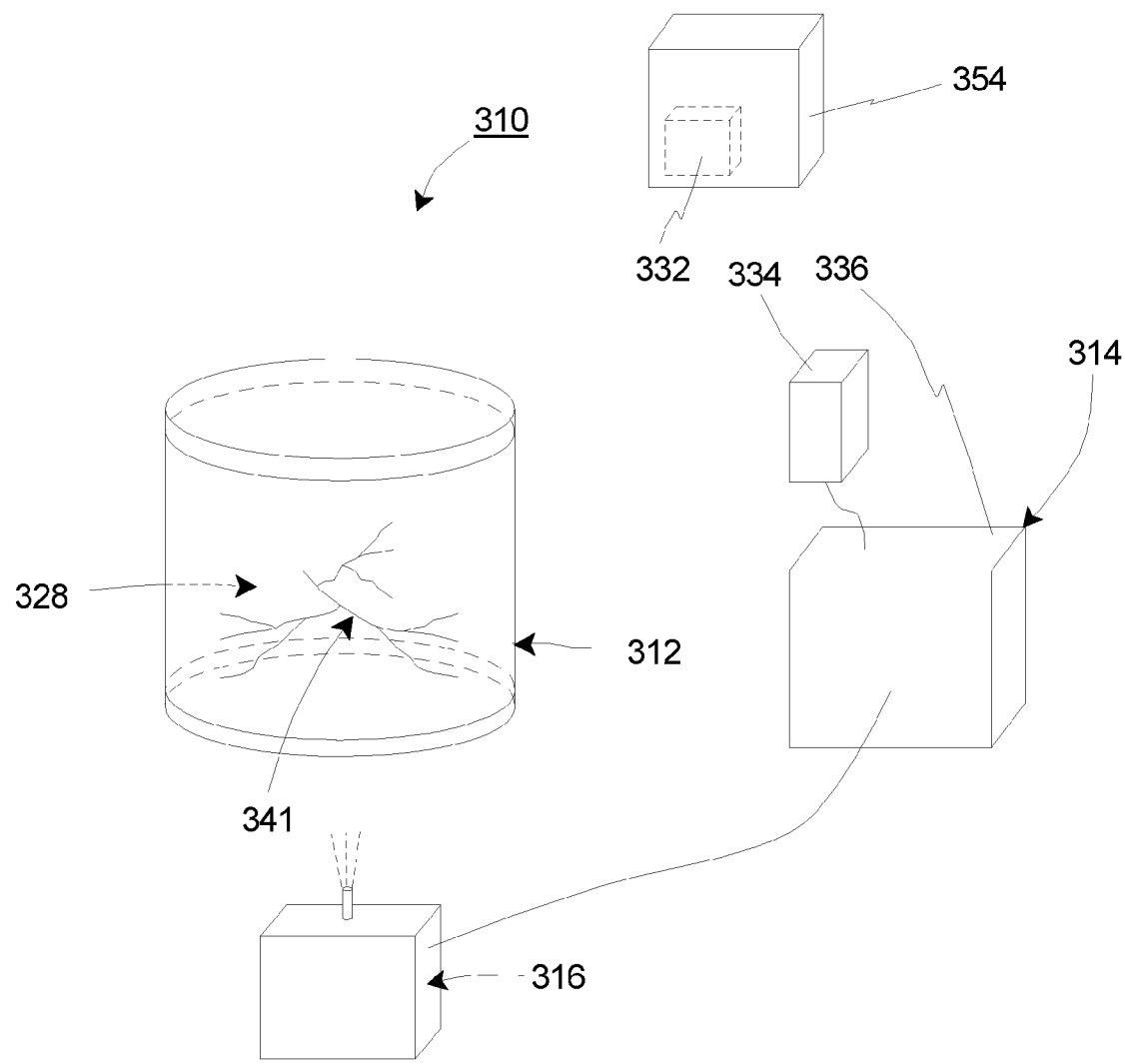
FIG. 3 is a simplified schematic illustration of another embodiment of the drum assembly.

FIG. 3 is a simplified schematic illustration of another embodiment of a drum assembly 310. In this embodiment, the drum assembly 310 is substantially similar to the drum assembly 10 previously described. For example, the drum assembly 310 again includes a drum 312, and a light pattern display generator 316, i.e. an animation laser, that are substantially identical to what was described above in relation to FIG. 1. However, in this embodiment, the drum assembly 310 further includes a stimulus generator 354 that is spaced apart from the drum 312 (and thus is not the drum 312 itself). Additionally, due to the presence of the external stimulus generator 354, the stimulus processor assembly 314 also has a somewhat different design than in the previous embodiment.

The design of the stimulus generator 354 can be varied. More particularly, the stimulus generator 354 can be any suitable device that generates sounds (e.g., music) that can be utilized in conjunction with the light pattern display generator 316. For example, in certain non-exclusive alternative embodiments, the stimulus generator 354 can be a musical instrument digital interface (MIDI) drum pad, Digital Multiplex (DMX) controller, electronic notebook, laptop, iPhone, MP3 player, iPad, or any other type of input or file.

The stimulus processor assembly 314 serves the same general purpose as in the previous embodiment. In particular, the stimulus processor assembly 314 again is configured to process each stimulus generated by the stimulus generator 354, and converts each stimulus to an electric input signal 38 (illustrated in FIG. 2). Additionally, the stimulus processor assembly 314 again converts each input signal 38 to an output voltage signal 40 (illustrated in FIG. 2). As shown in this embodiment, the stimulus processor assembly 314 includes one or more of a transmitter 332 (illustrated as a box in phantom), a receiver 334 and a controller 336 that each functions substantially similarly to those previously described. It is appreciated that, in this embodiment, the presence of the stimulus generator 354 obviates the need for a separate microphone as part of the stimulus processor assembly 314.

The transmitter 332 receives the input signals 38 from the stimulus generator 354 and transmits these input signals 38 to the receiver 334. In certain embodiments, the transmitter 332 can be positioned substantially within the stimulus generator 354. Alternatively, the transmitter 332 can be provided externally to the stimulus generator 354.

As in the previous embodiment, the transmitter 332 can wirelessly transmit the input signals 38 to the receiver 334. Alternatively, the transmitter 332 can be hard-wired to the receiver 334, or the transmitter 332 can be linked to the receiver 334 via a fiber optic connection, DMX cables, etc., as non-exclusive examples.

The receiver 334 again receives the input signals 38 from the transmitter 332 and sends the input signals 38 to the controller 336. In one embodiment, the receiver 334 can be part of and/or integrated as part of the controller 336. Alternatively, the receiver 334 can be a separate unit from the controller 336.

The controller 336 again reads the input signals 38 that are received by the receiver 334 and converts them to output signals 40. The controller 336 also transmits these output signals 40 to the light pattern display generator 316, i.e. the animation laser in the embodiment shown in FIG. 3.

The animation laser 316 receives the output signal 40 from the controller 336 and then selectively generates a laser output, i.e. a light display 341, that travels to the drum interior 328 in a substantially controlled manner.

Figure 4A:
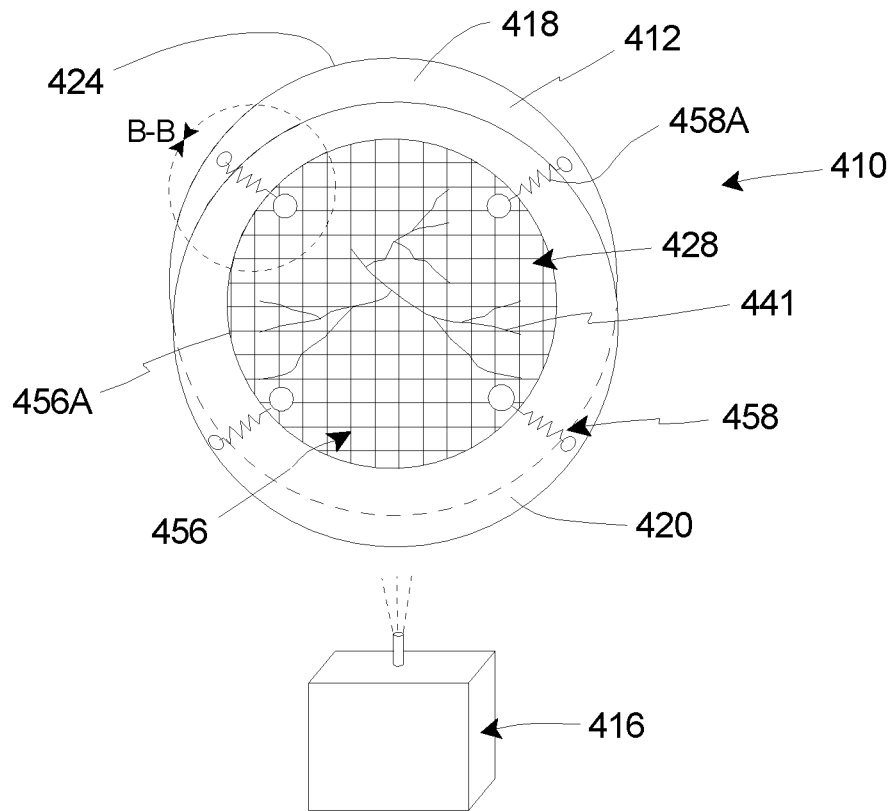
FIG. 4A is a simplified schematic illustration of a portion of an embodiment of the drum assembly, the drum assembly including a drum, a light pattern display generator, and a display receptor assembly.

FIG. 4A is a simplified schematic illustration of a portion of an embodiment of the drum assembly 410, i.e. an embodiment of the drum 412 and the light pattern display generator 416. In particular, in this embodiment, the drum 412 is a bass drum, and the light pattern display generator 416 is an animation laser that projects a light pattern display 441 into the drum interior 428 of the drum 412. Additionally, in this embodiment, the drum assembly 410 further includes a display receptor assembly 456, i.e. a scrim assembly in this embodiment that captures the light display 441 within the drum interior 428 to better and more effectively exhibit the light display 441 to the audience.

In this embodiment, the first head 420 of the drum 412, i.e. the head which faces generally toward the audience, can be clear, see-through, or at least substantially transparent to light. Thus, the light display 441 can be readily visible within the drum interior 428 to members of the audience.

Additionally, in certain embodiments, the second head 424 of the drum 412, i.e. the head which faces generally toward the drummer, can include a coated surface that inhibits any portion of the laser output, i.e. the light display 441, from passing fully through the drum interior and out through the second head 424. Further, the second head 424 can also be utilized for purposes of exhibiting at least a portion of the light display 441 to the audience. Stated in another manner, at least a portion of the light display 441 can be projected directly onto an interior surface of the second head 424.

It is appreciated that the animation laser 416 can be positioned and oriented so as to project the light display 441 through the first head 420 and/or through the drum shell 418.

As illustrated, the scrim assembly 456 is positioned at least substantially within the drum interior 428. Additionally, as provided herein, the scrim assembly 456 is configured to essentially capture the light display 441 within the drum interior 428 to better and more effectively exhibit the light display 441 to the audience. Further, in some such embodiments, the scrim assembly 456 can be configured to give the light display 441 a three-dimensional appearance to the audience.

The design of the scrim assembly 456 can be varied to suit the requirements of the light pattern display generator 416 and/or the drum 412 with which the scrim assembly 456 is being used. For example, in certain embodiments, the scrim assembly 456 includes one or more scrims 456A and a connector assembly 458 that connects the scrims 456A to an interior surface of the drum 412.

The one or more scrims 456A are positioned within the drum interior 428 to capture at least a portion of the light display 441 as it passes through the drum interior 428. As utilized herein, a "scrim" is a lightweight and translucent gauze-like material that can be formed from cotton, flax or another suitable material.

The scrim assembly 456 can include any desired number of scrims 456A. For example, in one non-exclusive embodiment, the scrim assembly 456 can include three generally circular-shaped scrims 456A of slightly varying sizes. In such embodiment, the first scrim 456A, i.e. the scrim 456A closest to the light pattern display generator 416, can be the smallest and/or thinnest of the scrims 456A; the second scrim 456A can be slightly larger and/or thicker than the first scrim 456A; and the third scrim 456A, i.e. the scrim 456A farthest away from the light pattern display generator 416, can be the largest and/or thickest of the scrims 456A. With such design, each of the scrims 456A can capture a portion of the laser output 441 as it is projected within the drum interior 428. This enables the light display 441 to have a more three-dimensional appearance within the drum interior 428. Any portion of the light display 441 that is not captured by the scrims 456A can hit the coated surface on the second head 424, and thus be retained within the drum interior 428. Alternatively, the scrim assembly 456 can be designed to include greater than three or less than three scrims 456A, and/or the scrims 456A can have different sizes and shapes than what has been described herein above.

The connector assembly 458 is configured to connect each of the scrims 456A to an interior surface of the drum 412. The connector assembly 458 can have any suitable design. For example, as illustrated in FIG. 4A, the connector assembly 458 can include four spaced apart, resilient connectors 458A, e.g., springs, to connect each scrim 456A to the interior surface of the drum 412. Alternatively, the connector assembly 458 can include greater than four or less than four connectors 458A for connecting each of the scrims 456A to the interior surface of the drum 412. The design and operation of the connectors 458A will be described in greater detail in connection with FIG. 4B.

Figure 4B:
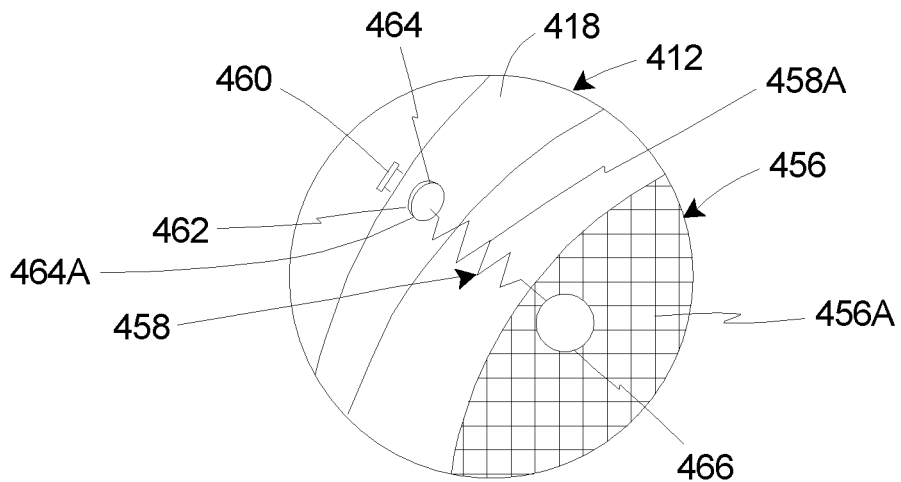
FIG. 4B is an enlarged view of a portion of the drum and the display receptor assembly bounded by dashed circle B-B in FIG. 4A.

FIG. 4B is an enlarged view of a portion of the drum 412 and the display receptor assembly 456 bounded by dashed circle B-B in FIG. 4A. In particular, FIG. 4B illustrates further details of the connector assembly 458 of the display receptor assembly 456.

The design of the connector assembly 458 can be varied. As shown, the connector assembly 458 includes a fastener 460, a drum aperture 462, e.g., in the drum shell 418, a connector mount 464, the connector 458A, and a scrim aperture 466. Alternatively, the connector assembly 458 can include more components or fewer components than those specifically noted herein.

In this embodiment, the fastener 460 is sized and shaped to fit through the drum aperture 462 that is formed in the drum shell 418. The fastener 460 is positioned to retain the connector mount 464 substantially adjacent to the drum shell 418. The connector mount 464 further includes a mount aperture 464A that is configured to retain one end of the resilient connector 458A. Additionally, the other end of the resilient connector 458A is connected to the scrim 456A via the scrim aperture 466. In some embodiments, the scrim aperture 466 can be a metal-enforced punch hole that is formed into the scrim 456A.

Figure 5:
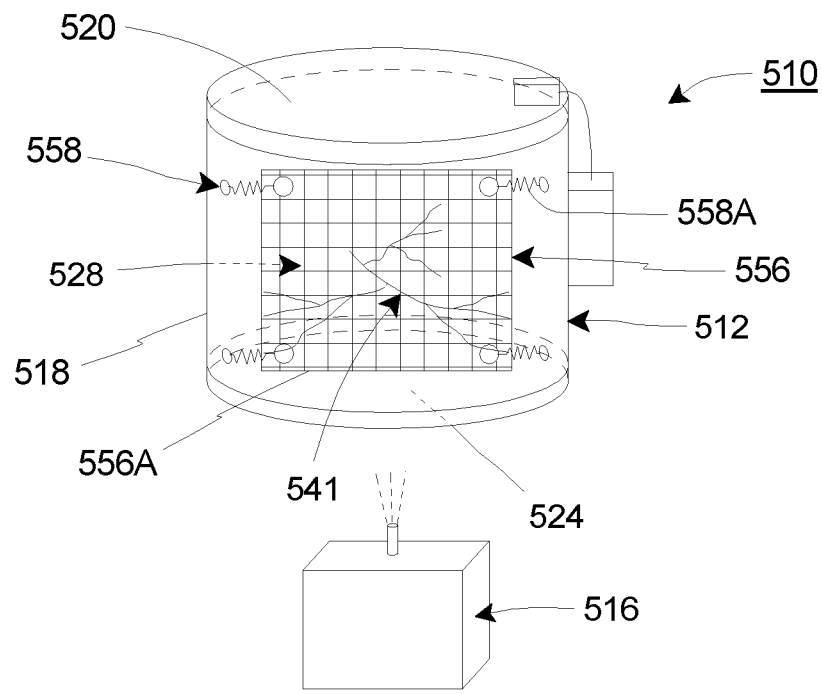
FIG. 5 is a simplified schematic illustration of a portion of another embodiment of the drum assembly, including the drum, the light pattern display generator, and the display receptor assembly.

FIG. 5 is a simplified schematic illustration of a portion of another embodiment of the drum assembly 510, i.e. another embodiment of the drum 512, the light pattern display generator 516, and the display receptor assembly 556. More specifically, in the embodiment shown in FIG. 5, the drum 512 is a tom (e.g., having a tom-tom or a floor tom design), and the light pattern display 516 is again an animation laser that projects the light pattern display 541 into the drum interior 528 of the drum 512. Additionally, the display receptor assembly 556 is again a scrim assembly that captures the light display 541 within the drum interior 528 to better and more effectively exhibit the light display 541 to the audience.

When using the present invention with a tom, at least a portion of the drum shell 518, i.e. the portion of the drum shell 518 that is closer to the audience, can be clear, see-through, or at least substantially transparent to light. Another portion of the drum shell, i.e. the portion of the drum shell 518 nearest the drummer, can have a white or mirrored wrap on the interior surface of the drum shell 518. Alternatively, such portion of the drum shell 518 can be formed from a frosted or sanded acrylic material. With this design, the light display 541 is readily visible to the audience through the drum shell 518. Additionally, the drummer is still protected from any portion of the laser output as the design of the portion of the drum shell 518 nearest the drummer inhibits any portion of the light display 541 from passing fully through the drum interior 528.

Further, in this embodiment, the first head 520 of the drum 512, i.e. the head which faces in a generally upward direction, can include a coated surface; and the second head 524 of the drum 512, i.e. the head which faces in a generally downward direction, can be clear, see-through, or at least substantially transparent to light. With such design, the light display 541 from the light pattern display generator 516, i.e. the animation laser, can be projected, if desired, through the second head 524 of the drum 512, and the first head 520 can also inhibit any portion of the light display 541 from passing fully through the drum interior 528 and out through the first head 520. Thus, it is appreciated that the animation laser 516 can be positioned and oriented so as to project the light display 541 through the second head 524 and/or through the drum shell 518.

Additionally, as shown in the embodiment illustrated in FIG. 5, the scrim assembly 556 can again be positioned at least substantially within the drum interior 528. As with the previous embodiment, the scrim assembly 556 again includes one or more scrims 556A and a connector assembly 558 that connects the scrims 556A to an interior surface of the drum 512.

The one or more scrims 556A are again positioned within the drum interior 528 to capture at least a portion of the light display 541 as it passes through the drum interior 528. In certain embodiments, the drum assembly 510 can be specifically configured such that a portion of the light display 541 is not captured by the scrims 556A, but is instead projected onto the portion of the drum shell 518 nearest the drummer.

Additionally, the scrim assembly 556 can include any desired number of scrims 556A. Further, in certain embodiments, each of the scrims 556A can be substantially rectangle-shaped, and the scrims 556A can be of varying sizes and thicknesses. The use of multiple scrims 556A can again better enable the light display 541 to have a more three-dimensional appearance as it is captured within the drum interior 528. Alternatively, the scrims 556A can have another suitable design and/or shape.

As noted, the connector assembly 558 connects each of the one or more scrims 556A to an interior surface of the drum 512. As with the previous embodiment, the connector assembly 558 can include at least one (and preferably at least two) resilient connectors 558A for purposes of connecting each scrim 556A to the interior surface of the drum 512.

Figure 6:
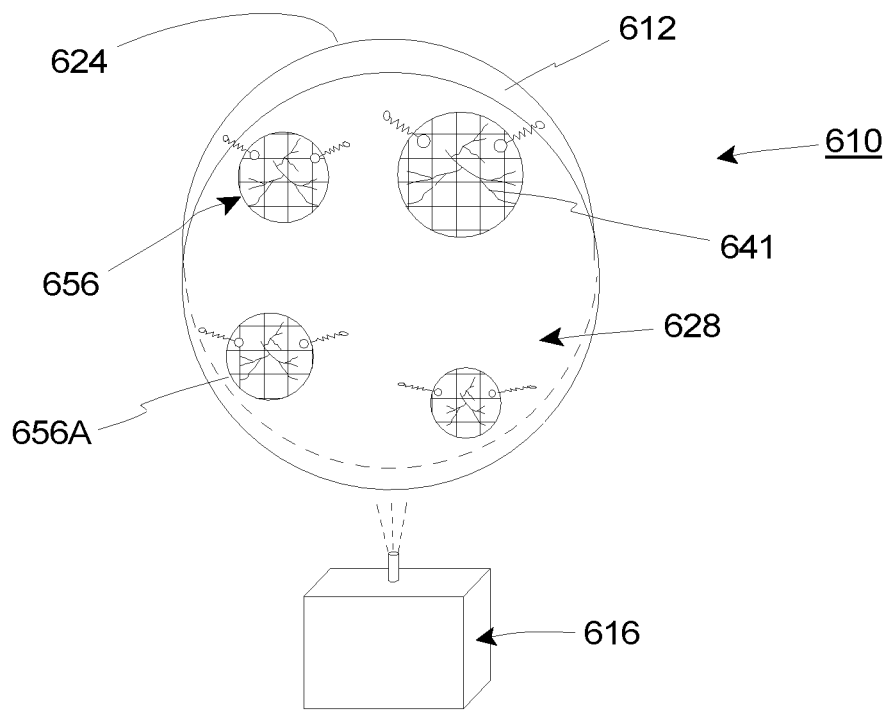
FIG. 6 is a simplified schematic illustration of a portion of still another embodiment of the drum assembly, including the drum, the light pattern display generator, and the display receptor assembly.

FIG. 6 is a simplified schematic illustration of a portion of still another embodiment of the drum assembly 610, i.e. another embodiment of the drum 612, the light pattern display generator 616, and the display receptor assembly 656. In this embodiment, as shown, the drum 612 can again be a bass drum having features and components that are designed in a substantially similar manner as those illustrated and described in relation to FIG. 4A. Alternatively, the drum assembly 610 can include a different type of drum 612.

However, in this embodiment, the display receptor assembly 656, i.e. the scrim assembly, is configured in a somewhat different manner than what was shown in FIG. 4A. More particularly, as shown in FIG. 6, the scrim assembly 656 includes a plurality of scrims 656A of varying sizes that are positioned in a somewhat random or chaotic manner within the drum interior 628 of the drum 612.

As with the previous embodiments, the scrim assembly 656 can include any desired number of scrims 656A. For example, as shown in FIG. 6, the scrim assembly 656 can include four substantially circular-shaped scrims 656A of varying sizes that are positioned within the drum interior 628. Alternatively, the scrim assembly 656 can include greater than four or less than four scrims 656A, and/or the scrims 656A can be other than substantially circular-shaped. For example, one or more of the scrims 656A can be substantially rectangular-shaped, square-shaped, oval-shaped, or some other shape.

In this embodiment, when the animation laser 616 projects the light pattern 641 onto the multiple scrims 656A that are mounted throughout the drum interior 628, the laser output 641 can be refracted within the drum interior 628 in such a manner as to create interesting and unpredictable patterns. Further, the residual portion of the laser output 641 that is not captured by the scrims 656A can be projected onto the coated surface of the second head 624 of the drum 612 to create even more interesting and unpredictable patterns.

Figure 7:
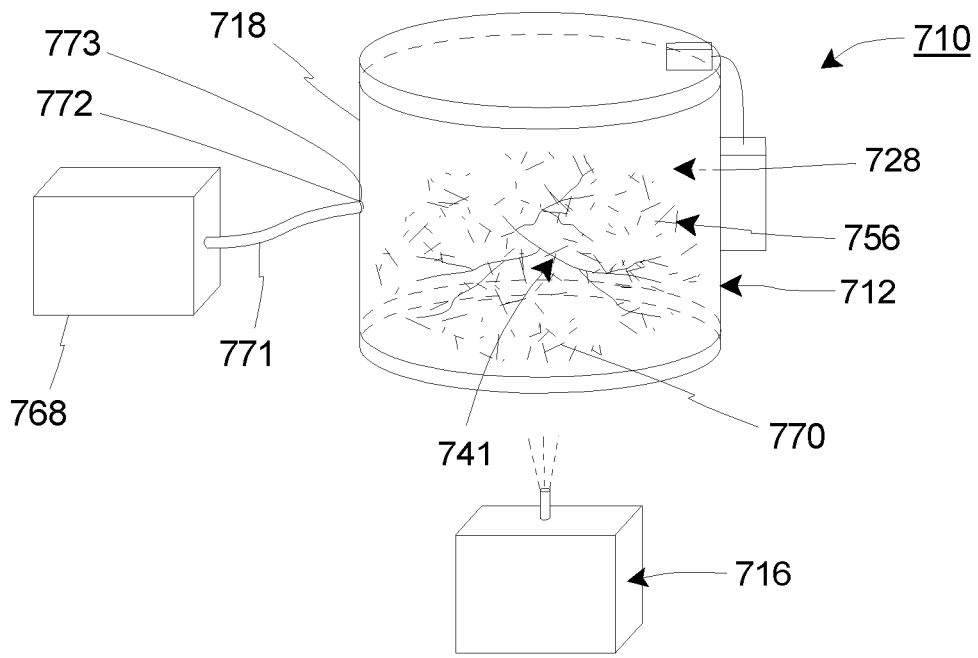
FIG. 7 is a simplified schematic illustration of a portion of yet another embodiment of the drum assembly, including the drum, the light pattern display generator, and the display receptor assembly.

FIG. 7 is a simplified schematic illustration of a portion of yet another embodiment of the drum assembly 710, i.e. another embodiment of the drum 712, the light pattern display generator 716, and the display receptor assembly 756. In this embodiment, as shown, the drum 712 can again be a tom drum having features and components that are designed in a substantially similar manner as those illustrated and described in relation to FIG. 5. Alternatively, the drum assembly 710 can include a different type of drum 712.

However, in this embodiment, the display receptor assembly 756 has a different design than what was shown in the previous embodiments. More specifically, as shown in FIG. 7, the display receptor assembly 756 includes a smoke generator 768 that is coupled to the drum 712 to generate a smoke cloud 770 within the drum interior 728. For example, in certain embodiments, the smoke generator 668 can be coupled to the drum 712 via a connector tube 771 that is coupled to the drum shell 718. The smoke cloud 770 can be directed through the connector tube 771 and into the drum interior 728 via a shell aperture 772 that is formed into the drum shell 718. Additionally, an aperture seal 773 can be formed around the shell aperture 772 to ensure that the smoke cloud 770 is directed as desired into the drum interior 728 and does not leak outside the drum 712.

During use, the light pattern display generator 716, e.g., the animation laser, can receive an output signal 40 (illustrated in FIG. 2) that has been generated from an input signal 38 (illustrated in FIG. 2), which was initiated via any suitable stimulus generator, e.g., the drum 712 itself or a stimulus generator external to the drum 712. The animation laser 716 can then generate a laser output, i.e. a light display 741, that is projected into the drum interior 728 and is subsequently captured by the smoke cloud 770. With such design, the light pattern 741 can thus provide a three-dimensional display in the smoke cloud 770 within the drum interior 728.

Figure 8:
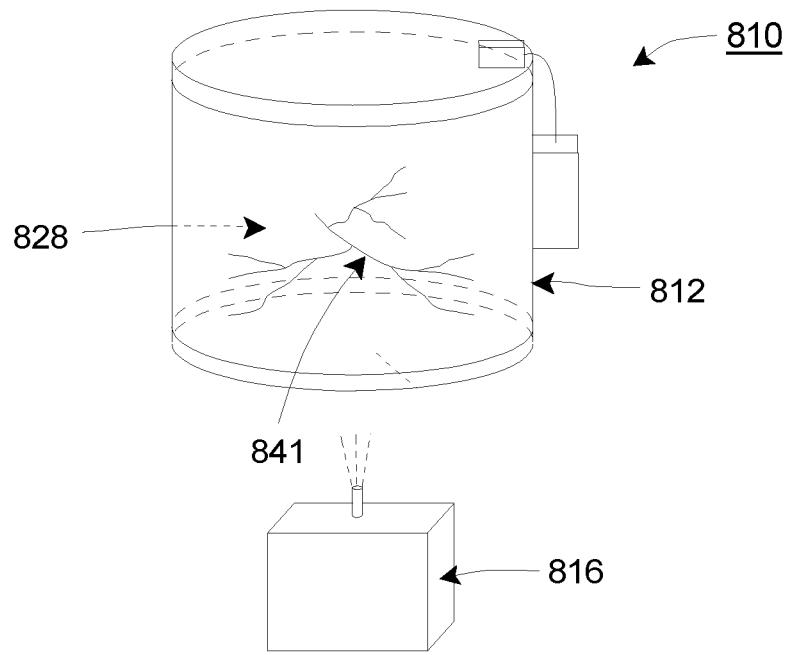
FIG. 8 is a simplified schematic illustration of a portion of still yet another embodiment of the drum assembly, including the drum and the light pattern display generator.

FIG. 8 is a simplified schematic illustration of a portion of still yet another embodiment of the drum assembly 810, i.e. another embodiment of the drum 812 and the light pattern display generator 816. In this embodiment, as shown, the drum 812 can again be a tom drum having features and components that are designed in a substantially similar manner as those illustrated and described in relation to FIG. 5. Alternatively, the drum assembly 810 can include a different type of drum 812.

However, in this embodiment, the light pattern display generator 816 has a different design than that illustrated and described in the previous embodiments. In particular, in the embodiment illustrated in FIG. 8, the light pattern display generator 816 is a hologram projector that projects the light pattern display 841 into the drum interior 828. With such design, the drum assembly 810 does not require a separate display receptor assembly to capture the light display 841. The hologram projector 816 can be configured to generate any desired size, shape and design of holographic images (e.g., three-dimensional holographic images) upon receiving an output signal 40 (illustrated in FIG. 2). Additionally, as with all embodiments, the drum assembly 810 can incorporate and/or utilize any suitable type of stimulus generator for generating the stimulus that is used to form the input signal 38 (illustrated in FIG. 2) that is ultimately converted to the output signal 40 that is directed to the hologram projector 816.

Figure 9:
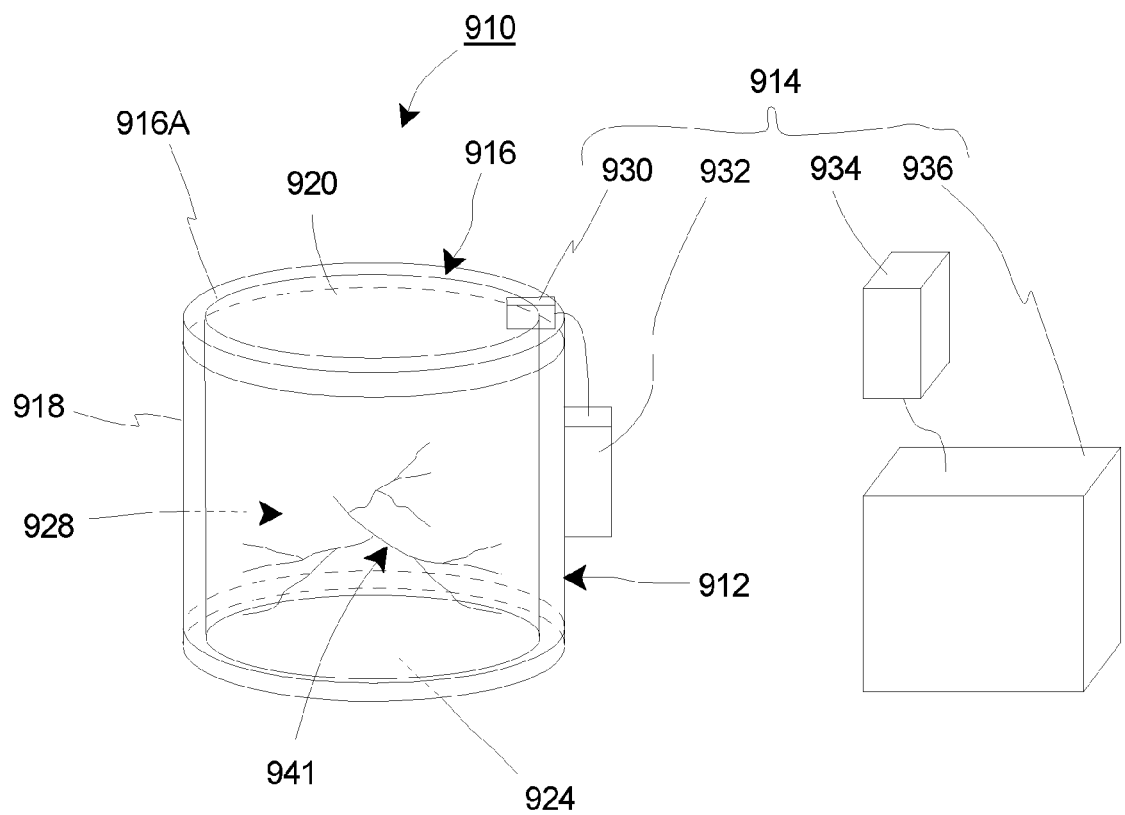
FIG. 9 is a simplified schematic illustration of still another embodiment of the drum assembly, the drum assembly including at least one drum and another embodiment of the light pattern display generator.

FIG. 9 is a simplified schematic illustration of still another embodiment of the drum assembly 910, the drum assembly 910 including at least one drum 912 and another embodiment of the light pattern display generator 916.

In this embodiment, the drum 912 can be substantially similar to any of the drums illustrated and described herein above. For example, the drum 912 can again include a drum shell 918, a first head 920 and a second head 924 that are substantially similar in design and function to such components in any of the embodiments illustrated and described above.

Additionally, the drum assembly 910 can further include a stimulus processor assembly 914 that processes each stimulus generated by the stimulus generator, i.e. the drum 912 in this embodiment, by converting each stimulus to an input signal 38 (illustrated in FIG. 2), and subsequently converting each input signal 38 to an output signal 40 (illustrated in FIG. 2). In some embodiments, the stimulus processor assembly 914 can again include a microphone 930, a transmitter 932, a receiver 934 and a controller 936 that are substantially similar in design and function to what was described above in relation to FIG. 1. Accordingly, such components will not be described again in detail.

However, in this embodiment, the light pattern display generator 916 has a different design than in previous embodiments. More specifically, as shown in FIG. 9, the light pattern display generator 916 includes a substantially cylindrical-shaped lumin disk 916A that is mounted within the drum interior 928 substantially directly adjacent to the drum shell 918. In some embodiments, the lumin disk 916A is mounted and sealed directly to the drum shell 918 to better maintain the structural integrity of the drum 912. Additionally, in various embodiments, the lumin disk 916A can include a controller/stimulus receiver and various plasma materials that are positioned and oriented in a patterned array, and that are utilized to create the light pattern display 941 within the drum interior 928. In certain embodiments, the drum shell 918 can be formed from a clear acrylic material that surrounds the lumin disk 916A and enables the audience to view the light pattern display 941 that is generated by the lumin disk 916A through the drum shell 918.

During use, with the drum 912 itself as the stimulus generator, the drummer strikes the first head 920 of the drum 912 to generate the stimulus that is processed by the stimulus processor assembly 914 and ultimately converted into the output signal 40. The output signal 40 is then directed to the lumin disk 916A via appropriate electrical connections. The plasma materials within the lumin disk 916A light up in response to the output signal 40 to create the desired light display 941 within the drum interior 928. Stated in another manner, the plasma materials light up within the lumin disk 916A to create the desired light display 941 in synchronization with the beat and rhythm of the various drum hits.

Figure 10:
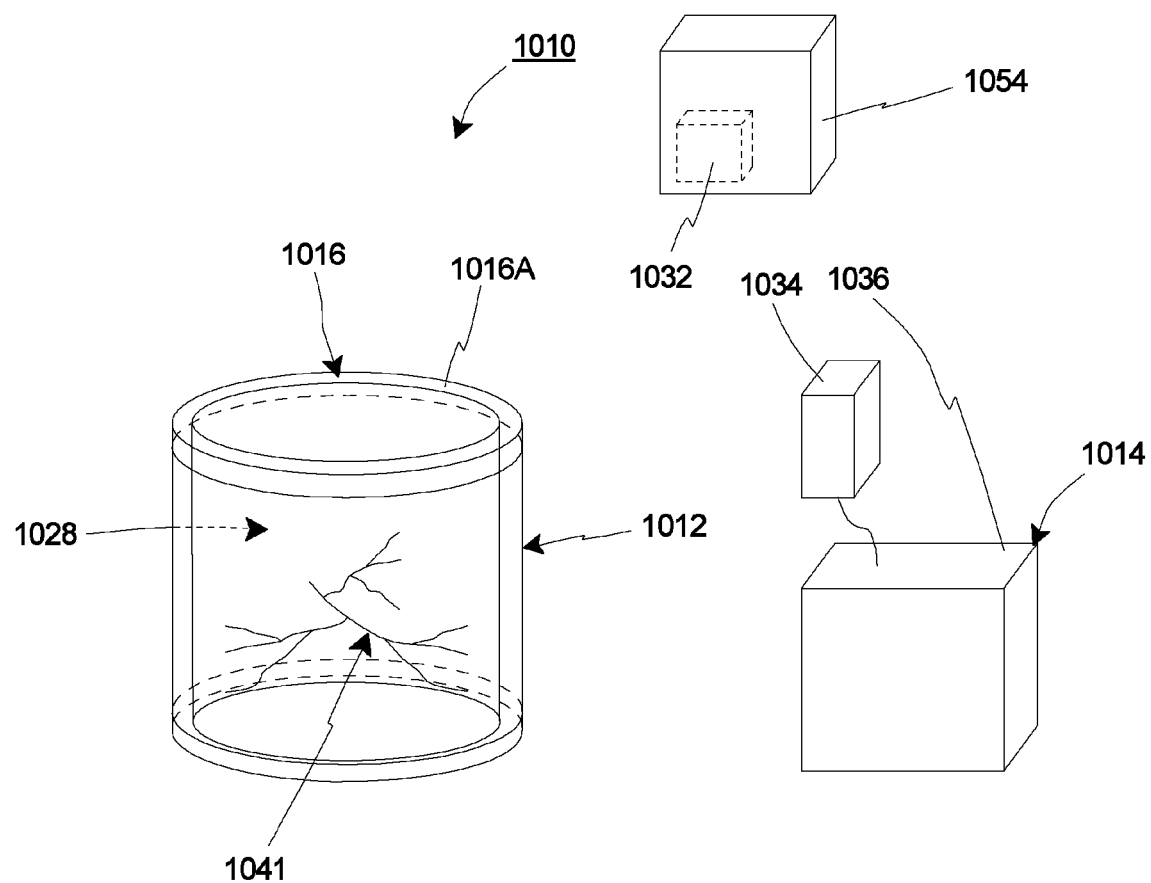
FIG. 10 is a simplified schematic illustration of yet another embodiment of the drum assembly.

FIG. 10 is a simplified schematic illustration of yet another embodiment of the drum assembly 1010. In this embodiment, the drum assembly 1010 is substantially similar to the drum assembly 910 illustrated and described in relation to FIG. 9. For example, the drum assembly 1010 again includes a drum 1012, and a light pattern display generator 1016, i.e. a lumin disk 1016A, that are substantially identical to what was described above in relation to FIG. 9. However, in this embodiment, the drum assembly 1010 includes a stimulus generator 1054 that is spaced apart from the drum 1012. Additionally, due to the presence of the external stimulus generator 1054, the stimulus processor assembly 1014 also has a somewhat different design than in the previous embodiment.

As shown in FIG. 10, the stimulus generator 1054 can be substantially similar to the stimulus generator 354 illustrated and described above in relation to FIG. 3. More particularly, the stimulus generator 1054 can be any suitable device that generates sounds (e.g., music) that can be utilized in conjunction with the lumin disk 1016A. For example, in certain non-exclusive alternative embodiments, the stimulus generator 1054 can be a musical instrument digital interface (MIDI) drum pad, laptop, iPhone, MP3 player, or another type of input or file.

The stimulus processor assembly 1014 serves the same general purpose as in the previous embodiments. In particular, in this embodiment, the stimulus processor assembly 1014 again is configured to process each stimulus generated by the stimulus generator 1054, and converts each stimulus to an electric input signal 38 (illustrated in FIG. 2), and subsequently converts each input signal 38 to an output voltage signal 40 (illustrated in FIG. 2). Similar to the embodiment shown in FIG. 3, the stimulus processor assembly 1014 includes one or more of a transmitter 1032 (illustrated as a box in phantom), a receiver 1034 and a controller 1036 that each functions substantially similarly to those previously described.

The transmitter 1032 receives the input signals 38 from the stimulus generator 1054 and transmits these input signals 38 to the receiver 1034. In some embodiments, the transmitter 1032 can wirelessly transmit the input signals 38 to the receiver 1034. Alternatively, the transmitter 1032 can be hard-wired to the receiver 1034, or the transmitter 1032 can be linked to the receiver 1034 via a fiber optic connection, DMX cables, etc., as non-exclusive examples.

The receiver 1034 again receives the input signals 38 from the transmitter 1032 and sends the input signals 38 to the controller 1036. The controller 1036 again reads the input signals 38 that are received by the receiver 1034 and converts them to output signals 40. The controller 1036 also transmits these output signals 40 to the light pattern display generator 1016, i.e. the lumin disk 1016A in this embodiment. The plasma materials within the lumin disk 1016A light up in response to the output signal 40 to create the desired light display 1041 within the drum interior 1028.

Figure 11:
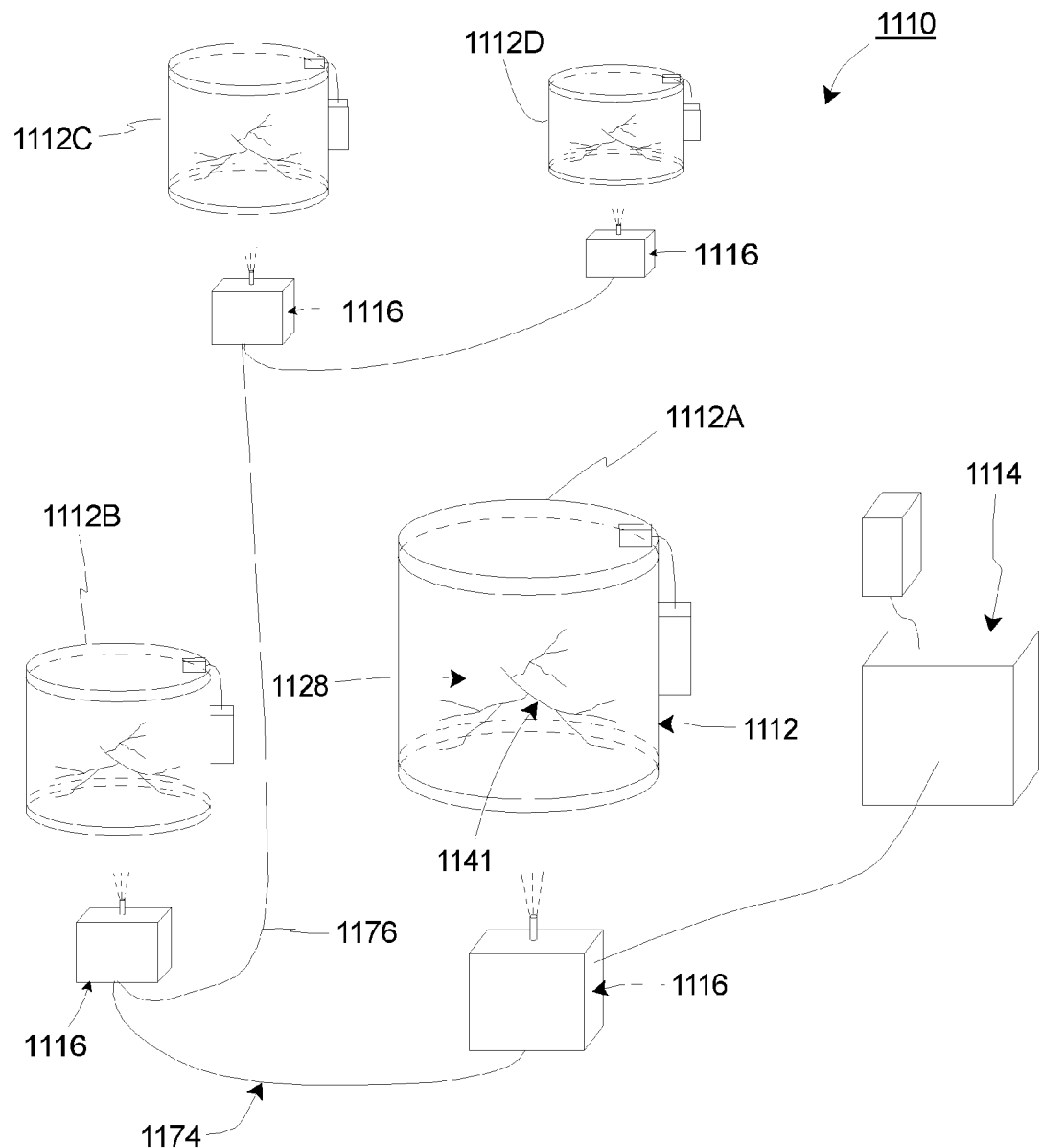
FIG. 11 is a simplified schematic illustration of still yet another embodiment of the drum assembly.

FIG. 11 is a simplified schematic illustration of still yet another embodiment of the drum assembly 1110. In this embodiment, as shown in FIG. 11, the drum assembly 1110 includes a plurality of drums 1112. Additionally, the drum assembly 1110 is configured such that at least one the drums 1112, if not all of the drums 1112, is designed to exhibit a light pattern display 1141 within the drum interior 1128.

The drum assembly 1110 can include any suitable number of drums 1112. For example, in the embodiment shown in FIG. 11, the drum assembly 1110 includes four drums 1112, i.e. a first drum 1112A, a second drum 1112B, a third drum 1112C and a fourth drum 1112D. Alternatively, the drum assembly 1110 can include greater than four drums 1112 or less than four drums 1112.

It is appreciated that each of the drums 1112A-1112D can have any suitable design, e.g., the drums 1112A-1112D can include one or more bass drums, one or more tom drums, one or more snare drums, or other suitable types of drums. For example, each of the drums 1112A-1112D can be substantially similar to one or more of the drums that have been illustrated and described herein above. Additionally, each of the drums 1112A-1112D can have any suitable size and shape.

Further, it is also appreciated that each of the drums 1112A-1112D can incorporate or utilize any suitable type of stimulus generator, e.g., the drum itself or an external stimulus generator, for purposes of ultimately having the light pattern display 1141 generated within the drum interior 1128. Additionally, it is further appreciated that with the different types of stimulus generators that may be utilized, any suitable type of stimulus processor assembly 1114 can be used to process the stimuli that are generated by the stimulus generator. Moreover, a separate stimulus processor assembly 1114 can be used in association with each drum 1112A-1112D, and/or a single stimulus processing generator 1114 can be used in association with more than one, or possibly all, of the drums 1112A-1112D.

Still further, it is appreciated that any type(s) of light pattern display generator 1116 may be used within the drum assembly 1110. For example, the drum assembly 1110 can include one or more animation laser-type light pattern display generators 1116, one or more hologram projector-type light pattern display generators 1116, or one or more lumin disk-type light pattern display generators 1116, such as have been described in detail herein above. Alternatively, the drum assembly 1110 can use another suitable type of light pattern display generator 1116. Moreover, a separate light pattern display generator 1116 can be used in association with each drum 1112A-1112D, and/or a single light pattern display generator 1116 can be used in association with more than one, or possibly all, of the drums 1112A-1112D.

It the embodiment specifically illustrated in FIG. 11, a single stimulus processing assembly 1114 is utilized for all of the drums 1112A-1112D, whereas a separate light pattern display generator 1116 is used in association with each of the drums 1112A-1112D.

Additionally, as shown, the light pattern display generators 1116 are electrically coupled or connected to one another with an electrical connector assembly 1174. The electrical connector assembly 1174 can have any suitable design. For example, the electrical connector assembly 1174 can include a plurality of electric connectors 1176 (e.g., cables or "daisy chains") for purposes of providing the desired electrical connection between the light pattern display generators 1116.

During use of the drum assembly 1110, a separate light pattern display 1141 can be generated within the drum interior 1128 of each of the drums 1112A-1112D. Additionally, the light pattern display 1141 within each drum 1112A-1112D can be similar to or different than any of the other light patterns displays 1141. Further, the timing of the individual light pattern displays 1141 can be similar to or different than the timing of any of the other light pattern displays.

Figure 12:
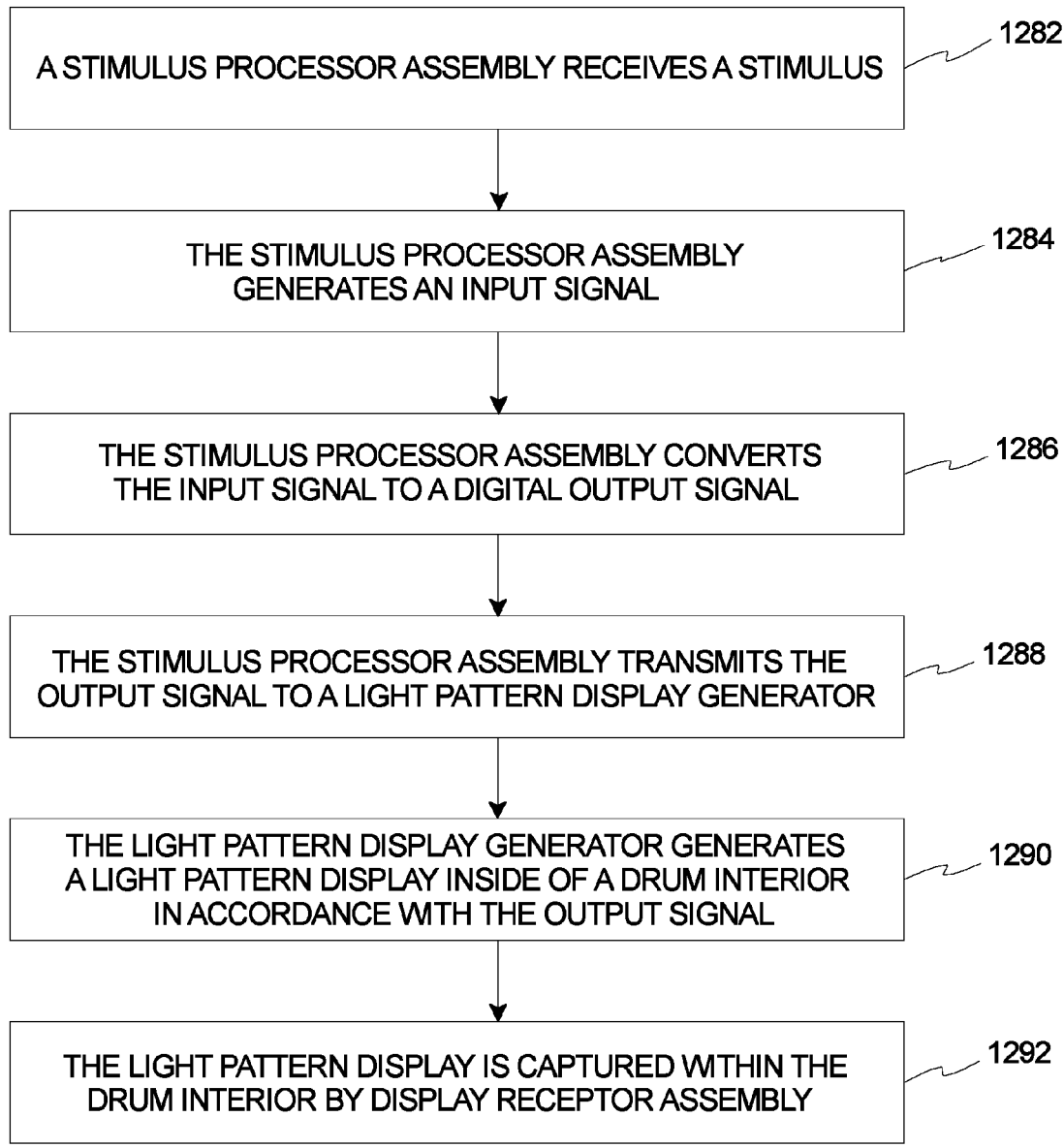
FIG. 12 is a flow chart illustrating one embodiment of a method for generating a light pattern display from a light pattern display generator within a drum assembly.

FIG. 12 is a flow chart illustrating one embodiment of a method for generating a light pattern display from a light pattern display generator, e.g., an animation laser, a hologram projector or a lumin disk, within a drum assembly. In one embodiment, the method includes one or more of the following steps. Additionally, it is appreciated that the order of the steps illustrated and described in FIG. 12 are not necessarily indicative of how the drum assembly operates chronologically, as one or more of the steps can be combined, reordered, and/or performed simultaneously without deviating from the intended breadth and scope of the drum assembly.

In step 1282, a stimulus is received by a stimulus processor assembly. As provided herein, the stimulus can be from a user striking one or more drums, or the stimulus can be from an external source such as a MIDI signal or input, a DMX controller, etc., as non-exclusive examples.

In step 1284, the stimulus processor assembly generates an input signal. This signal can be an analog signal, e.g., from a drum, or a digital signal, e.g., a MIDI input, a DMX controller, etc., as non-exclusive examples.

In step 1286, the stimulus processor assembly converts the input signal to a digital output signal.

In step 1288, the stimulus processor assembly transmits the output signal to a light pattern display generator, such as an animation laser or a lumin disk, which can be accomplished using an optical fiber and drive circuitry.

In step 1290, the light pattern display generator generates a light pattern display which is controlled by the output signal. In one embodiment, the light pattern display is projected into a drum interior of the drum by the light pattern display generator. Alternatively, the light pattern display generator can be positioned within a drum interior of the drum, and the light pattern display can be generated directly within the drum interior.

In step 1292, the light pattern display is captured within the drum interior by a display receptor assembly, such that the light pattern display can be better and more effectively exhibited to the audience. In alternative embodiments, the display receptor assembly can include one or more scrims, a smoke generation assembly, or another suitable display receptor assembly. Still alternatively, it is appreciated that in certain embodiments, e.g., when the light pattern display generator is a hologram projector, a display receptor assembly may not be required to effectively capture the light pattern display within the drum interior.

It is understood that although a number of different embodiments of the drum assembly 10 have been illustrated and described herein, one or more features of any one embodiment can be combined with one or more features of one or more of the other embodiments, provided that such combination satisfies the intent of the present invention.

While a number of exemplary aspects and embodiments of the drum assembly 10 have been discussed above, those with skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A drum assembly comprising:
   a drum including a drum shell that at least partially defines a drum interior;
   a stimulus processor assembly that (i) receives a stimulus, (ii) generates an input signal, and (iii) converts the input signal to an output signal; and
   a light pattern display generator that receives the output signal from the stimulus processor assembly, the light pattern display generator generating a light pattern display in response to the output signal, the light pattern display generator being positioned outside of the drum interior, the light pattern display occurring at least partially within the drum interior.

2. The drum assembly of claim 1 wherein the stimulus processor assembly includes a controller that converts the input signal to the output signal using a conversion algorithm.

3. The drum assembly of claim 1 wherein the light pattern display generator generates the light pattern display only when the input signal has a voltage amplitude that exceeds a predetermined threshold level.

4. The drum assembly of claim 1 wherein the stimulus is generated by one or more drums.

5. The drum assembly of claim 1 wherein the stimulus is generated remotely from the drum.

6. The drum assembly of claim 5 wherein the stimulus is generated by a musical instrument digital interface input.

7. The drum assembly of claim 1 wherein the light pattern display has an intensity that is correlative to at least one of a decibel level of the stimulus, a pulse width of the output signal, and a frequency of the output signal.

8. The drum assembly of claim 1 wherein the light pattern display occurs substantially entirely within the drum interior.

9. The drum assembly of claim 1 wherein the input signal is an analog signal, and the output signal is a digital signal.

10. A drum assembly comprising:
a drum including a drum shell that at least partially defines a drum interior;
a stimulus processor assembly that (i) receives a stimulus, (ii) generates an input signal, and (iii) converts the input signal to an output signal; and
a light pattern display generator that receives the output signal from the stimulus processor assembly, the light pattern display generator generating a light pattern display in response to the output signal, the light pattern display occurring at least partially within the drum interior, wherein the light pattern display generator is an animation laser that is positioned outside of the drum interior, the animation laser projecting at least a portion of the light pattern display into the drum interior.

11. The drum assembly of claim 10 further comprising a display receptor assembly that is positioned at least partially within the drum interior, the display receptor assembly being configured to capture at least a portion of the light pattern display that is projected into the drum interior.

12. The drum assembly of claim 11 wherein the display receptor assembly includes at least one scrim that is positioned within the drum interior, and wherein the at least one scrim is configured to capture at least a portion of the light pattern display that is projected into the drum interior.

13. The drum assembly of claim 11 wherein the display receptor assembly includes a smoke generator that is coupled to the drum to generate a smoke cloud within the drum interior, and wherein the smoke cloud is configured to capture at least a portion of the light pattern display that is projected into the drum interior.

14. The drum assembly of claim 10 wherein the stimulus is generated by a musical instrument digital interface input that is positioned remotely from the drum.

15. A drum assembly comprising:
a drum including a drum shell that at least partially defines a drum interior;
a stimulus processor assembly that (i) receives a stimulus, (ii) generates an input signal, and (iii) converts the input signal to an output signal; and
a light pattern display generator that receives the output signal from the stimulus processor assembly, the light pattern display generator generating a light pattern display in response to the output signal, the light pattern display occurring at least partially within the drum interior, wherein the light pattern display generator is a hologram projector that is positioned outside of the drum interior, the hologram projector projecting at least a portion of the light pattern display into the drum interior.

16. The drum assembly of claim 15 wherein the stimulus is generated by a musical instrument digital interface input that is positioned remotely from the drum.

17. A method comprising the steps of:
generating an input signal from a stimulus with a stimulus processor assembly;
converting the input signal to an output signal with the stimulus processor assembly;
transmitting the output signal to a light pattern display generator; and
generating a light pattern display with the light pattern display generator in response to the output signal that occurs at least partially within a drum interior of a drum;
wherein the step of generating a light pattern display includes the steps of generating the light pattern display with an animation laser that is positioned outside the drum interior, and projecting at least a portion of the light pattern display into the drum interior with the animation laser.

18. The method of claim 17 further comprising the step of capturing at least a portion of the light pattern display with a display receptor assembly that is positioned at least partially within the drum interior.

19. The method of claim 17 wherein the step of generating an input signal includes the stimulus being generated by a musical instrument digital interface input that is positioned remotely from the drum.

20. A method comprising the steps of:
generating an input signal from a stimulus with a stimulus processor assembly;
converting the input signal to an output signal with the stimulus processor assembly;
transmitting the output signal to a light pattern display generator; and
generating a light pattern display with the light pattern display generator in response to the output signal that occurs at least partially within a drum interior of a drum;
wherein the step of generating a light pattern display includes the steps of generating the light pattern display with a hologram projector that is positioned outside the drum interior, and projecting at least a portion of the light pattern display into the drum interior with the hologram projector.

21. The method of claim 20 wherein the step of generating an input signal includes the stimulus being generated by a musical instrument digital interface input that is positioned remotely from the drum.

* * * * *